United States Patent
Joyce et al.

(10) Patent No.: US 10,791,609 B2
(45) Date of Patent: *Sep. 29, 2020

(54) METHOD AND APPARATUS FOR CONTROLLING LIGHT LEVELS TO SAVE ENERGY

(71) Applicant: The Watt Stopper, Inc., Carlsbad, CA (US)

(72) Inventors: Jason Joyce, Carlsbad, CA (US); Thomas L. Grey, Carlsbad, CA (US)

(73) Assignee: The Watt Stopper, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/678,958

(22) Filed: Nov. 8, 2019

(65) Prior Publication Data
US 2020/0146128 A1    May 7, 2020

Related U.S. Application Data

(63) Continuation of application No. 16/443,356, filed on Jun. 17, 2019, now Pat. No. 10,485,077, which is a continuation of application No. 15/659,460, filed on Jul. 25, 2017, now Pat. No. 10,327,307, which is a continuation of application No. 14/861,476, filed on Sep. 22, 2015, now Pat. No. 9,717,129, which is a continuation of application No. 14/011,641, filed on Aug. 27, 2013, now Pat. No. 9,144,139.

(60) Provisional application No. 61/693,714, filed on Aug. 27, 2012.

(51) Int. Cl.
*H05B 37/02* (2006.01)
*H05B 47/11* (2020.01)
*H05B 47/19* (2020.01)

(52) U.S. Cl.
CPC ............ *H05B 47/11* (2020.01); *H05B 47/19* (2020.01); *Y02B 20/40* (2013.01); *Y02B 20/46* (2013.01); *Y02B 20/48* (2013.01)

(58) Field of Classification Search
CPC ............ H05B 37/0218; H05B 37/0245; H05B 37/0254; H05B 37/0272; H05B 37/0281
USPC ......................................... 315/307, 312, 360
See application file for complete search history.

(56) References Cited

U.S. PATENT DOCUMENTS

| | | | |
|---|---|---|---|
| 2012/0143357 A1* | 6/2012 | Chemel | H05B 47/105 700/90 |
| 2013/0163243 A1* | 6/2013 | Reed | H05B 45/00 362/235 |

(Continued)

*Primary Examiner* — Tung X Le
(74) *Attorney, Agent, or Firm* — Crockett & Crockett, PC; K. David Crockett, Esq.; Niky Economy Syrengelas, Esq.

(57) ABSTRACT

An occupancy sensor with integral light level sensors is configured to turn off or disable peripheral circuits and go into a periodic deep sleep mode to reduce phantom loading. Peripheral circuits include occupancy sensor circuits and relay drive circuits, but may include other circuits such as communication circuits. The sensor may be configured to periodically wake itself up, check ambient light conditions to see if lighting is below the set threshold. If it is not, the sensor goes back to sleep. If it is, then the sensor can power up the occupancy sensor circuit to see if the space is occupied; if not, it can go back to sleep. If the space is occupied, it can turn on other peripheral circuits necessary to control the load.

7 Claims, 4 Drawing Sheets

(56) References Cited

U.S. PATENT DOCUMENTS

2013/0293877 A1* 11/2013 Ramer .................. H05B 47/18
356/213
2014/0028198 A1* 1/2014 Reed ..................... H05B 47/16
315/152

* cited by examiner

METHOD AND APPARATUS FOR CONTROLLING LIGHT LEVELS TO SAVE ENERGY

RELATED APPLICATIONS

This application is a continuation of U.S. application Ser. No. 16/443,356, filed Jun. 17, 2019, now U.S. Pat. No. 10,476,301, which is a continuation of U.S. application Ser. No. 15/659,460, filed Jul. 25, 2017, now U.S. Pat. No. 10,327,307, which is a continuation of U.S. application Ser. No. 14/861,476, filed Sep. 22, 2015, now U.S. Pat. No. 9,717,129, which is a continuation of U.S. application Ser. No. 14/011,641, filed Aug. 27, 2013, now U.S. Pat. No. 9,144,139, which in turn claims priority to U.S. Provisional Application 61/693,714, filed Aug. 27, 2012.

FIELD OF THE INVENTIONS

The inventions described below relate to the field of lighting control components such as occupancy sensors with integral light level sensors.

BACKGROUND OF THE INVENTIONS

Lighting control devices must consume a certain amount of electrical power in order to perform their functions, such as occupancy sensing and supplying power to lighting loads. Often referred to as "phantom loads" or "vampire loads", this lighting control device power consumption can be considerable in large buildings. For example, if two thousand occupancy sensors can save 20 milliamperes of electrical current at 24 volts (direct current), or 0.48 W each, then 960 W (0.96 kW) can be saved. Given inefficiencies in low voltage power supply design, the savings at the mains power supply will be higher (10-20% higher). Multiplied over thousands of buildings in a geographic area, power savings can be substantial.

Lighting control devices such as occupancy sensors often include an ambient light level sensor that measures the amount of ambient light. It is common for the ambient light level sensor to monitor the ambient light level to determine if an adequate amount of light is available in the space so that it does not need to turn lights on if occupancy is detected. Light may come from a window or skylight or from other electric lights not controlled by a particular lighting control device. Typically, the ambient light level sensor allows the user to adjust the ambient light level threshold at which this determination is made.

SUMMARY

The devices and methods described below provide for lighting control components such as occupancy sensors with integral light level sensors. An occupancy sensor is configured to turn off or disable peripheral circuits and go into a periodic deep sleep mode to reduce phantom loading. Peripheral circuits include occupancy sensor circuits and relay drive circuits, but may include other circuits such as communication circuits (radiofrequency or infrared). The sensor may be configured to periodically wake itself up, check ambient light conditions to see if lighting is below the set threshold. If the ambient light conditions are not below the set threshold, the sensor goes back to sleep. If the ambient light conditions are below the set threshold, then the sensor can power up the occupancy sensor circuit to determine if the space is occupied; if the space is not occupied, the sensor can go back to sleep. If the space is occupied, the occupancy sensor can turn on other peripheral circuits necessary to control the load, e.g., activate a relay or triac control circuit to supply power to the light load. Multiple levels of implementation based on stand-alone control or system level control in a lighting control installation may be used.

In a stand alone installation, it is common to have an occupancy sensor that includes an internal relay or dimming circuit (e.g., triac as is known in the art) for controlling mains power to a lighting load. Another common installation is to have a low voltage occupancy sensor send a signal to another device, commonly called a power pack, that itself has a relay to control power to a lighting load; this configuration allows multiple occupancy sensors to be connected in parallel to control one power pack, which may supply power to all the lighting loads in a large space.

Lighting control systems are also available. Such systems allow components such as occupancy sensors and wall switches to communicate with a control that controls power to the lighting load. The control may be built into the occupancy sensor or other component, or it may be a separate component. Communication may happen via wires, e.g., CAT5 network cable or power line, or wirelessly, e.g., via radio frequency or infrared. In such systems, an ambient light sensor may be built into an occupancy sensor or other component, or it may be a stand alone component, often referred to as a daylight sensor as are known in the art. The system may reduce power usage as noted above for just the component having the ambient light sensor, however, this does not take advantage of additional power saving available in a system configuration. In a preferred embodiment, the component having the ambient light sensor sends a signal to the system components (or master control if the system is so configured) to indicate that ambient light is above or below the set threshold. This signal may be on a dedicated wire in a cable (e.g., a simple high or low voltage) or may be via a particular message send over a communication bus (wired or wireless). Components receiving the signal may then shut down nonessential circuits to reduce power usage using the techniques described herein.

DETAILED DESCRIPTION OF THE INVENTIONS

Figure 1:
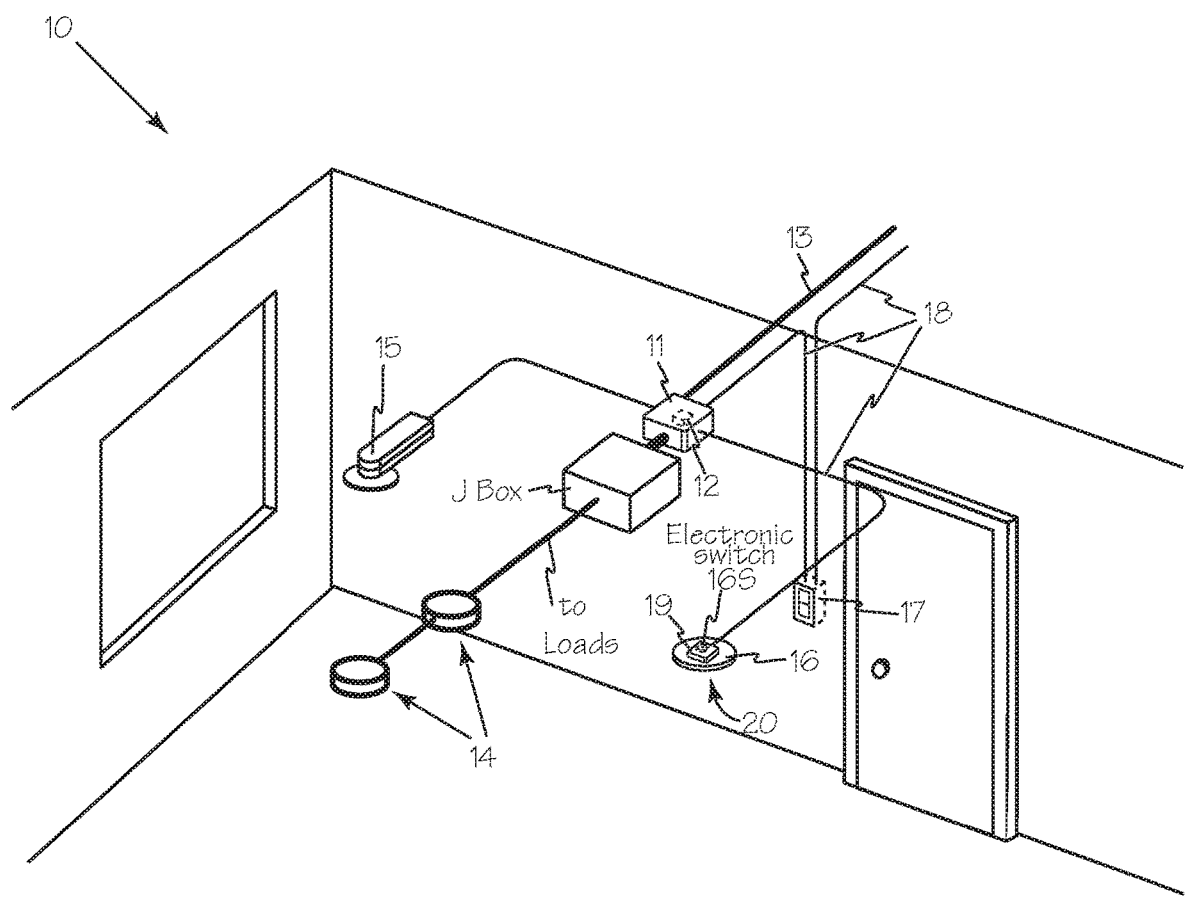
FIG. 1 is a perspective view of a lighting control system with light level energy savings as described below.

FIG. 1 illustrates lighting system 10 for controlling light levels to save energy. System components are connected together via any suitable cables that carry a communication bus and low voltage power connections such as Wattstopper's Lighting Management Registered Jack (LMRJ) cables or any other suitable network cables such as CAT5 network cables. A Room Controller 11, such as the LMRC-102 includes internal microcontroller 12 and essential and nonessential circuits is connected to mains power 13 to generate low voltage power for the system and is also the control component that controls power to the lighting load 14 (on/off relay control for two independent lighting loads for this model). Other system components include closed loop daylight sensor 15 (an LMLS-400), a dual technology occupancy sensor 16 (LMDC-100 using ultrasonic and pyroelectric infrared sensors), and a suitable light switch 17 such as an LMSW-102 two position wall switch. An ambient light threshold is set using a button on the LMLS-400 or via a hand held remote commission tool (not shown), but may also have a default value based on lighting recommendations or office lighting/illumination standards. When the ambient light threshold is reached, sensor 15 sends a message over proprietary bus 18 to all other system components, which respond by shutting down nonessential or peripheral circuits and maintains power to essential circuits. In the system, sensor 16 may sense occupancy and so decide that it should keep its sensor circuits active, or it may shut down those circuits as described above. Switch 17 may put itself into deep sleep and only wake up if one of its buttons is pressed, indicating that a user wants to override the low power mode and turn on a light, or periodically wake up to see if a message is waiting (or poll other components) to reactivate nonessential circuits to come back to full operation. In another configuration, room controller 11 can reduce the low voltage power supplied to the other components in the system. The controller typically provides 24 volts (direct current, VDC) but this could be reduced to 12 VDC when ambient light exceeds the set threshold. Most components operate at 3-8 VDC internally, so this change effectively makes them more energy efficient As illustrated in FIG. 1, stand alone occupancy sensor 16 can control power to any peripheral circuit by including a suitable electronic switch, such as a MOSFET or other suitable component, between the internal power supply and the circuit to be controlled. Internal microcontroller 19 operating with firmware controls the operation of the electronic switch based on input it receives from any suitable sensor such as ambient light sensor 20, or simple cadmium sulphide sensors, photodiodes, and advanced sensors like the TAOS TSL2550 digital light sensor. "Microcontroller" may also mean microprocessor, application specific integrated circuit, field programmable gate array, or series of logic devices that may execute firmware, state diagram or other operational sequence. Depending on the sensor, the input to the microcontroller may be a single digital input, an analog-to-digital converter input, or a communication bus input (e.g., the so-called "I Squared C" (I2C) bus. If the ambient light is greater than a threshold value, the electronic switch is made to interrupt power to the peripheral circuit. For example, a typical ultrasonic output transducer may consume 10 milliamperes and the ultrasonic receiver may consume 2-3 milliamperes, both of which can be turned off. The microcontroller then enters a deep sleep mode that is periodically interrupted via an internal timer, as is well known in the art, so that the firmware may execute routines to check ambient light level and, if necessary, start to power up other peripheral circuits as needed to determine if the light load should be turned on. The output of the light level sensor itself may be tied to an external interrupt of the microcontroller, typically with a trimming potentiometer to set the ambient light level threshold to take advantage of the logic high and logic low voltage input specifications of the microcontroller input. A very low power comparator may be designed between the ambient light sensor and microcontroller to provide a clean digital signal to the microcontroller.

In a stand alone configuration where a low voltage sensor sends a signal to a power pack, the signal from the sensor is typically generated on occupancy detection to tell the power pack to turn on power to the lighting load. The power pack may be designed such that the absence of this signal causes the power pack to disable internal circuits, such as a relay drive circuit, and to go into a low power sleep mode. Alternatively, the sensor signal may be just a voltage transition for occupancy and a pulse for the ambient light condition, or a combination thereof. The sensor signal may be used to interrupt a microcontroller in the power pack from its sleep, or the microcontroller may periodically wake up and poll the sensor input signal. Alternatively, additional signal wires may be provided between the sensor and power pack to communicate the need for low power operation, but that is not preferred as it adds cost for the additional wires and their installation.

In an occupancy sensor that connects to mains voltage, an electronic switch may be configured to be controlled directly by a passive ambient light sensor to interrupt power to the main switching power supply that converts mains AC voltage into a suitable DC voltage for the microcontroller and other electronics. The phantom load is then reduced to the power consumed by the passive light sensor and electronic switch circuit that can be easily designed to consume microwatts of power. The ambient light sensor generates a voltage across it that is used to drive the gate of a MOSFET designed to withstand the mains voltage, and a simple trimming potentiometer may be used to set the threshold level. When the MOSFET is placed between the mains connection and the bridge rectifier of the switching power supply, virtually all phantom power may be eliminated. Electronic switches may also be used to control the switching power supply, for example, by switching in different value components to reduce the current limit when there is sufficient ambient light; this may be under direct control of the passive ambient light sensor or the microcontroller. For example, the TNY274-280 TinySwitch®-III Family (Power Integrations, Inc.) allows adjustment of the lower current limit that improves efficiency.

Figures 2, 3, 4:
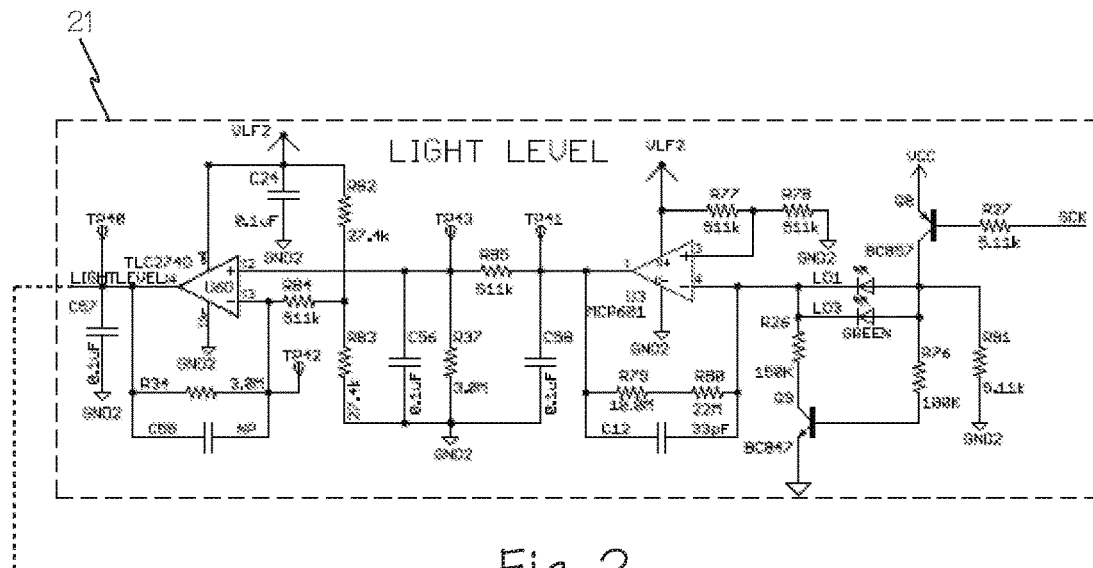
FIG. 2 is a schematic diagram of an ambient light level sensor circuit.
FIG. 3 is a schematic diagram of a portion of a lighting controller circuit using the light sensor of FIG. 1.
FIG. 4 is a schematic diagram of a lighting level switch for the lighting control of FIG. 3.

A stand alone occupancy sensor can disable portions of a sensor circuit by using a suitable electronic switch, such as a transistor. FIG. 2 shows an ambient light level sensor circuit 21. LD1 and LD2 are parallel, reverse biased green LEDs that develop a voltage across them when exposed to light (only one is used in actual manufacture in this embodiment, the other is at a different location on a printed circuit board for use in a different model of product having the light sensor in a physically different location). This voltage is subsequently amplified and filtered by circuits based on U3 and U6D as well as passive filtering by C58, R85, R37, C56, and C57. The output of this circuit goes directly to an analog-to-digital converter input of microcontroller U4 in FIG. 3. The desired ambient light threshold is set by the user using PB1 input switch shown in FIG. 4 and whose output also goes directly to microcontroller U4 in FIG. 3. In a set up mode, which may be set by a series of DIP switches not shown, for example, the user presses PB1 when the ambient light level is acceptable and the lighting load is off to set the ambient light threshold. If the ambient light is at or above the threshold, then the lighting load is not turned on and power saving methods can be instituted.

Figure 5:
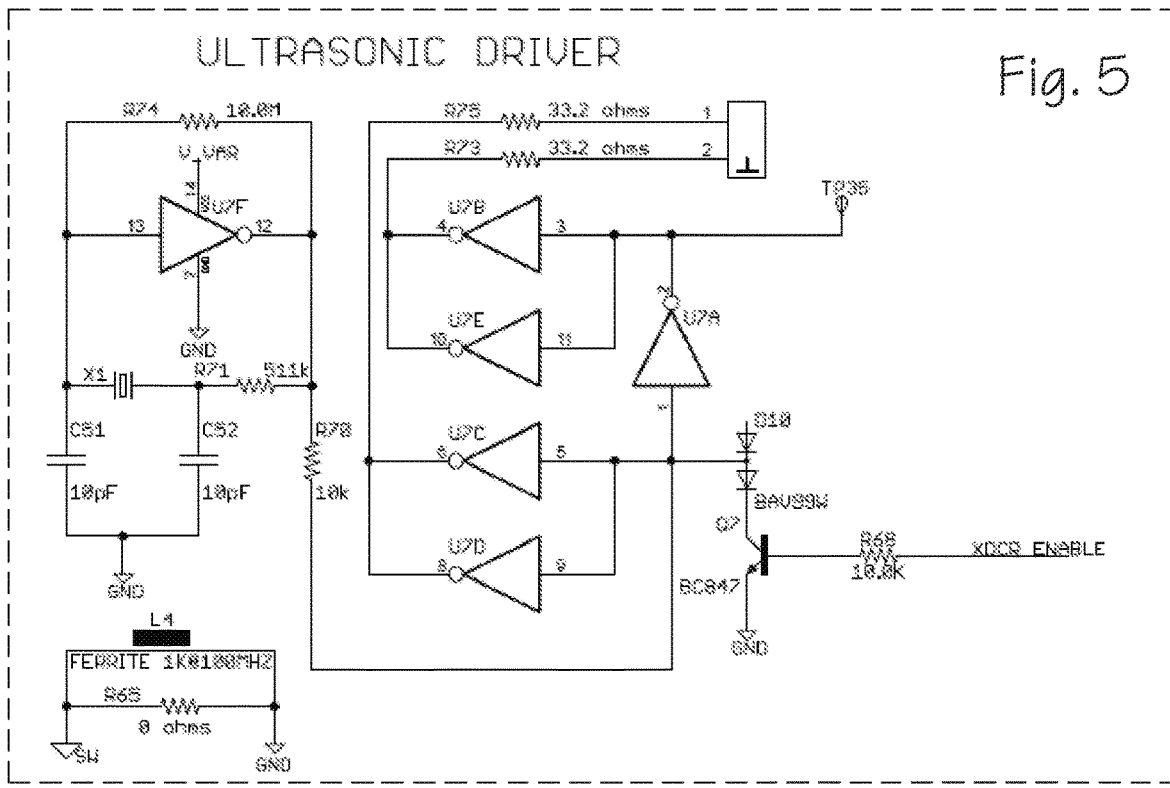
FIG. 5 is a schematic diagram of an ultrasonic output transducer driver circuit.

FIG. 5 shows an ultrasonic output transducer driver circuit. X1 is a 40 kHz crystal that is input into ultrasonic transducer TX driver circuit comprised of U7A-E. Q7 is a transistor that is controlled by an output from microcontroller U4 (FIG. 3). Crystal X1 is free running causing transducer driver U7 to provide about 10 milliamperes of current to transducer TX to create an ultrasonic sound output. When the microcontroller determines that the ambient light level is at or above threshold (or just above threshold), then it activates Q7, which causes the crystal signal from X1 to short to ground. Transducer driver U7 sends no current to transducer Tx, saving 10 milliamperes of phantom load current.

Figure 6:
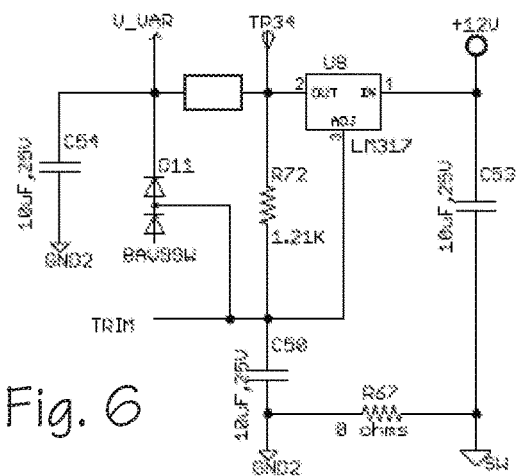
FIG. 6 is a schematic diagram of a power supply providing the power to the driver of FIG. 5 and the ultrasonic detector of FIG. 7.
Figure 7:
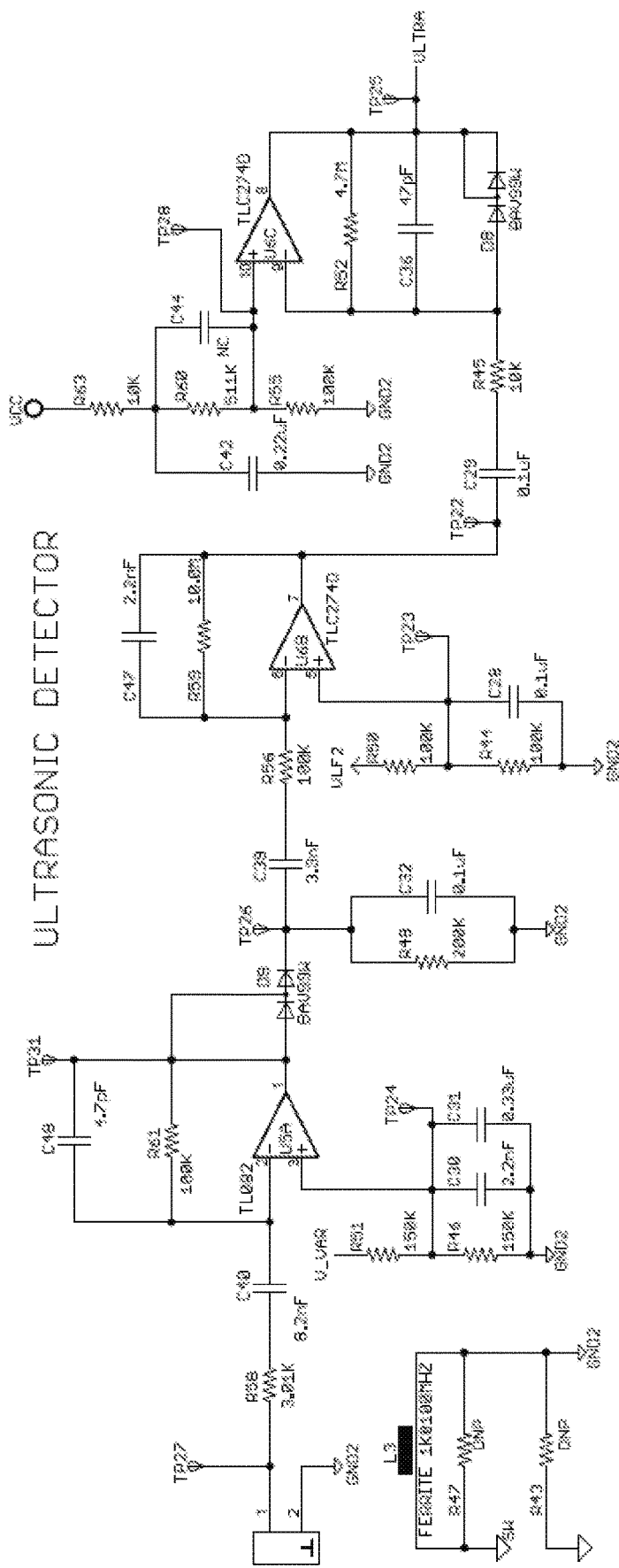
FIG. 7 is a schematic diagram of an ultrasonic detector circuit.

FIG. 6 shows a variable output power supply that generates the supply voltage V_VAR for the ultrasonic driver circuit in FIG. 5. One skilled in the art can insert a microcontroller controlled transistor between signal points V_VAR and TP34 to completely turn off power to the ultrasonic driver circuit as well as to the ultrasonic detector circuit of FIG. 7. Although not critical to the invention, ultrasonic detector circuit works as follows: ultrasonic sound is picked up by receiving transducer RX whose signal is then amplified and filtered in stages based on amplifiers U5A, U6B and U6C. The amplified and filtered ultrasonic signal at TP25 is fed to an analog to digital converter input of microcontroller U4 (FIG. 2). The microcontroller firmware analyzes this signal for signs of occupancy in the monitored space.

A variable output power supply can also reduce the power to the ultrasonic driver circuit to achieve lower power but also maintain some level of occupancy sensing. When there is sufficient ambient light, the variable power supply can be set to a lower operating voltage. This results in a lower amplitude ultrasonic signal and effectively reduces sensitivity. Reduced sensitivity would require a large motion to be detected (e.g., a body coming within a certain distance of the sensor). Upon detection, the variable power supply can increase the operating voltage to create a stronger ultrasonic signal that is then able to differentiate fine motion, such as hand motion at a desk, to maintain occupancy. This can be implemented for the ultrasonic detector as well, and applies to any occupancy sensor that is driven by a certain voltage level (e.g., pyroelectric sensors, microwave sensors, sound sensors, etc.)

Alternatively, power to the lighting management sensor control systems may be controlled as a function of time. For example, all sensor circuits are fully operational from 7:30 am to 6:00 pm on Monday through Saturday (business hours). Between 6:00 pm and 7:30 am and on Sundays, all sensor power is off. The on and off times may be controlled by the users and adjusted as necessary. The time control of phantom loads may also be a layer of power control and operate in conjunction with an occupancy/lighting level sensor layer that only controls sensor power levels during business hours.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A lighting control system comprising:
a lighting control component with a microcontroller and a first group of circuits and a second group of circuits for controlling the application of mains power to loads;
one or more loads operatively connected to the lighting control component;
a light sensor operatively connected to the lighting control component, the light sensor producing a first signal when it senses light levels above a predetermined threshold and a second signal when it senses light levels below the predetermined threshold;
wherein the microcontroller is operable to reduce power to the first group of circuits when the first signal is received and restores full power to the first group of circuits when the second signal is received;
one or more lighting or load control sensors, each sensor having a first group of circuits and a second group of circuits; and
a low voltage power and communication network interconnecting the lighting control component and the one or more lighting or load control sensors;
wherein the microcontroller is operable to transmit signals through the low voltage power and communication network to the one or more lighting or load control sensors to reduce power to the first group of circuits when the first signal is received and restore full power to the first group of circuits when the second signal is received.

2. The lighting control system of claim 1, wherein the microcontroller also disables power to the second group of circuits when the first signal is received and enables power to the second group of circuits when the second signal is received.

3. The lighting control system of claim 1, wherein the microcontroller is operable to transmit signals through the low voltage power and communication network to the one or more lighting or load control sensors to also disable power to the second group of circuits when the first signal is received and enable power to the second group of circuits when the second signal is received.

4. The lighting control system of claim 1, wherein the one or more lighting or load control sensors are wirelessly connected to the lighting control component.

5. The lighting control system of claim 1, wherein the microcontroller is also operable to disable power to the second group of circuits when the first signal is received and enables power to the second group of circuits when the second signal is received.

6. The lighting control system of claim 1, wherein the microcontroller is operable to transmit signals through the low voltage power and communication network to the one or more lighting or load control sensors to also disable power to the second group of circuits when the first signal is received and enable power to the second group of circuits when the second signal is received.

7. The lighting control system of claim 1, wherein the one or more lighting or load control sensors are wirelessly connected to the lighting control component.

* * * * *